Patented Mar. 11, 1952

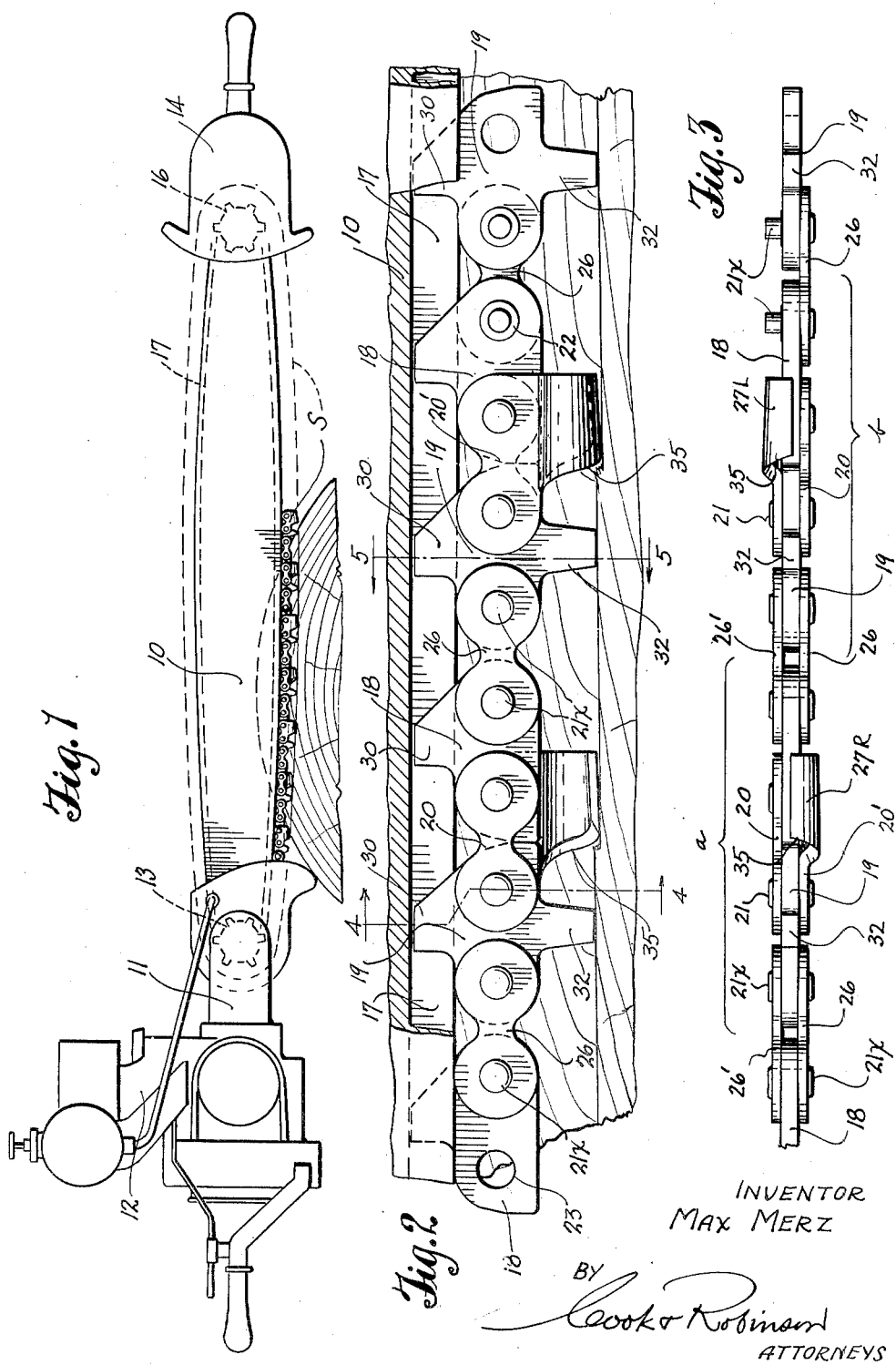

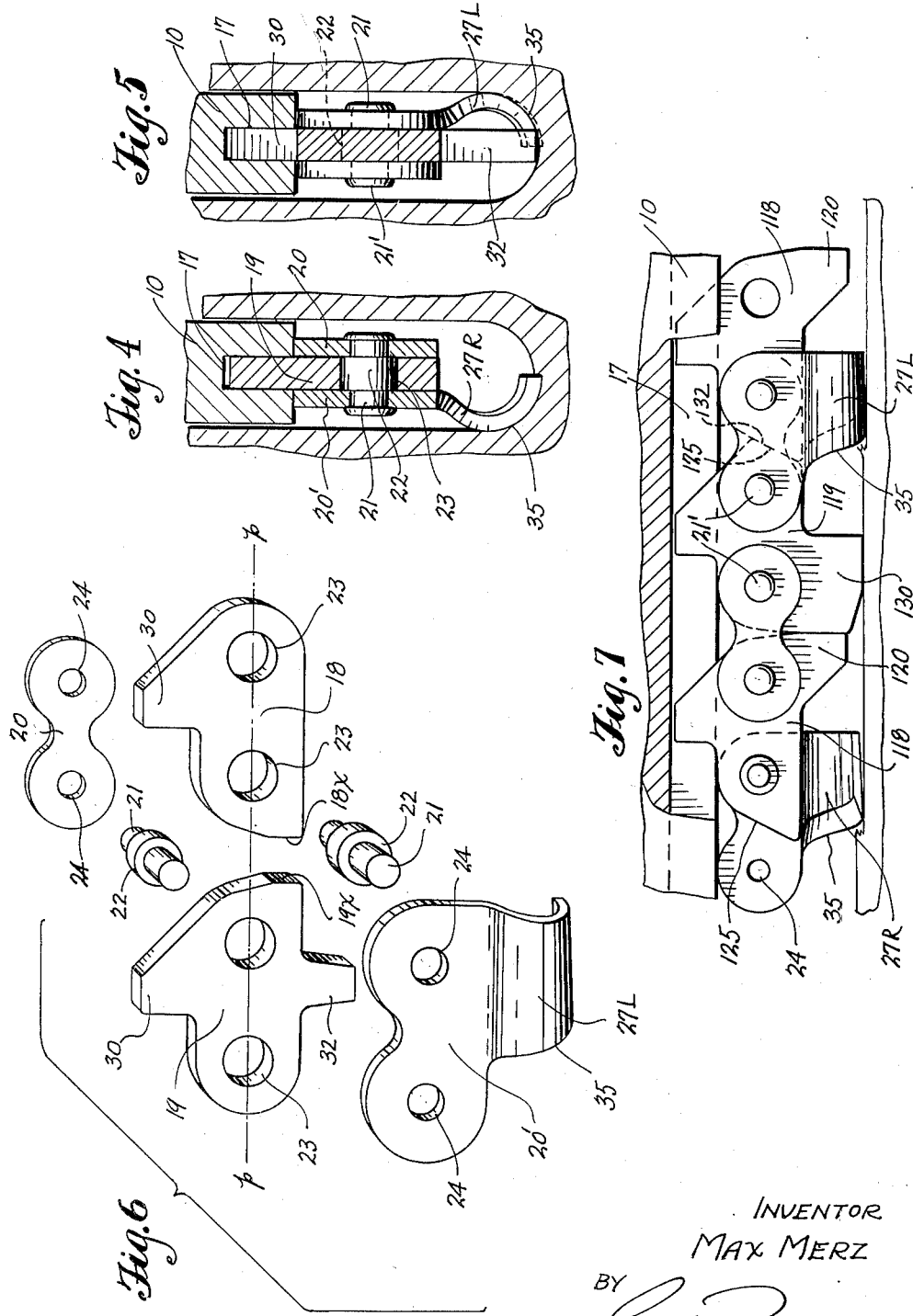

2,589,015

UNITED STATES PATENT OFFICE 2,589,015

CHAIN SAW

Max Merz, Seattle, Wash., assignor to Engineering Research, Inc., a corporation of Washington Application July 22, 1947, Serial No. 762,662

1 Claim. (Cl. 143—135)

This invention relates to power saws and it has reference more particularly to improvements in engine driven chain saws of that type described and illustrated in my co-pending application, filed on November 1, 1946, under Serial No. 707,112, wherein I disclosed a power saw that is designed for the falling of trees, the bucking of logs and for various other sawing operations and wherein the sawing element itself was illustrated as comprising a continuous belt of pivotally connected links including cutter links of novel type, located at regularly spaced intervals along the belt, alternately at opposite sides thereof and designed to cut away the opposite side surfaces and bottom of the kerf.

In order to impart a better understanding of the improvements of the present invention, their objects and advantages, it will here be explained that in the actual use of the saw of the above identified application, there was some difficulty experienced when sawing in hard wood due to a tendency of the cutter carrying links of the saw chain to "jack-knife" and thereby cause, or tend to cause, the cutters to gouge into the kerf and to stall or cut irregularly; the main objection to this action being that it slowed down the speed of the sawing or cutting operation.

In view of the above, it has been the principal object of this invention to provide improvements, particularly in the design of certain of the links of the chain, whereby an abutting relationship is obtained between links that had the tendency to buckle or "jack-knife," that eliminates or prevents this action and a smoother and speedier cutting operation is made possible.

More specifically stated, the present invention resides in the provision of a saw chain of continuous belt form, adapted for operation along and in guiding contact with opposite edges of a saw blade and about sprocket wheels at the ends of the blade, and which chain is made up of a succession of pivotally joined links, arranged in groups, and wherein the connected groups alternately are equipped with "right" and "left" cutters.

Still further objects of the invention are to be found in the details of construction of the various links embodied in the link groups and in the relationship of the cutter links with the abutting links of the chain, as will hereinafter be fully described.

In accomplishing the above mentioned and other objects of the invention, I have provided the improved details of construction, the preferred forms of which are illustrated in the accompanying drawings, wherein—

Fig. 1 is a side view of a power saw comprising a saw chain in which the improvements of the present invention are embodied.

Fig. 2 is an enlarged, side view of a portion of the saw chain and a sectional detail of a portion of the chain supporting bar or blade as associated therewith.

Fig. 3 is an edge view of a part of the saw chain, showing the disposition of the cutter links, relative to those links that come into end to end abutment.

Fig. 4 is an enlarged, cross section taken on the line 4—4 in Fig. 2.

Fig. 5 is an enlarged, cross section taken on the line 5—5 in Fig. 2.

Fig. 6 is a perspective view of the links as embodied in one of the link groups, shown in disconnected relationship for better understanding of details of construction.

Fig. 7 is a side view of a portion of a saw chain of an alternative form of construction.

Referring more in detail to the drawings—

The general type of power saw for which the present saw chain is designed for use is shown in Fig. 1 wherein 10 designates a saw blade or bar and 11 designates a frame to which one end of the bar is secured for the intended use of the saw. Supported by the frame 11 is an engine, designated generally by reference numeral 12, that operates through suitable power transmission devices and controls not herein shown, to rotatably drive a sprocket wheel 13 that is located in the frame and in the plane of and adjacent the inner end of the bar 10. At the outer end of the bar 10, a handle frame 14 is fixed rigidly thereto and in this frame a sprocket wheel 16 is rotatably mounted in the plane of the bar 10. The chain saw embodied by this invention, designated generally by reference character "S," is of continuous belt form and extends about the sprocket wheels 13 and 16 and is supported by and guided along the opposite longitudinal edges of the bar 10 as is common and well understood in the art.

The bar or blade 10 is formed in each of its opposite longitudinal edges with a square cut channel 17 as shown in Figs. 2, 4 and 5 and in which channels certain parts of some of the links of the chain are designed to travel to guide and functionally support the chain in use, as will presently be explained.

Referring now more particularly to the saw of Figs. 1 to 6 inclusive: The saw chain designated generally by reference character "S" comprises a succession of pivotally joined links, arranged in groups, and the successive link groups also are joined pivotally end to end to make up the continuous saw chain —S—.

Each link group, as will be best understood by reference to Fig. 6, comprises one link which I will hereinafter refer to as a "spacer link" and designated by reference numeral 18; a link which I will refer to as a "depth gauge link," designated by numeral 19, and two "connector links" designated respectively by reference numerals 20 and 20'. In the assembly of links in each group, the links 18 and 19 are located end to end in the plane of the chain belt. The connector links are located at opposite sides of the links 18 and 19 which they join and the links in the group are pivotally joined by pivot pins or rivets 21. As seen in Figs. 4 and 5, the pins have roller bushings 22 applied about their medial portions, fitted in holes 23 in the end portions of the spacer and depth gauge links, and the opposite end portions of the pins are extended through openings 24 in the connector links and have flattened heads 21' at their outer ends to hold them functionally in place.

As shown in Figs. 2 and 3, the successive groups of link are joined end to end by paired connector links 26—26', and these are alike in size and shape and are arranged at opposite sides of the links which they directly connect and are pivotally joined thereto by pivot pins 21x like the pins 21 above described.

It is shown also in Figs. 2 and 3 that in the successive groups of links as arranged along the chain belt, the connector links 20' are formed integrally with the kerf cutters 27R and 27L which will presently be more fully described; these cutters being disposed alternately at opposite sides of the chain belt, and are designed as "right" and "left" cutters, each to cut away a portion of the side and bottom of the kerf as the chain advances.

In the saw chain as thus assembled, and as shown in Figs. 2 and 3, the spacer links 18 and depth gauge links 19 are arranged alternately end to end, in the central plane of the chain, while the paired connector links 26 and 26' are at opposite sides of the chain, as also are the connector links 20 and 20', but these latter alternate, at opposite sides of the chain. The pivot centers of the chain links are all equally spaced.

Formed on the inside edge of each of the spacer links 18 and each of the depth gauge links 19, along the trailing end thereof, is a flange or wing 30, extending in the plane of the flat body portion of the link and adapted for guided travel in the longitudinal slots or channels 17 of the bar 10, as in Figs. 4 and 5, to functionally support and guide the chain in its travel.

The connector links 20—20' also 26—26' in their arrangement at opposite sides of the chain, are designed for travel upon the edge portions of the bar 10 at opposite sides of the bar channels, thus to hold the outer edges of the guide wings 30 from contact with the bases of the channels and also to add to the stability of the chain saw in making a cut, as will be understood by reference to Figs. 4 and 5.

Each of the depth gauge links 19 is formed at its outer edge, and substantially mid-way between its ends, with an outwardly extended leg or runner 32, which is designed to engage with the bottom of the kerf being cut to limit the depth of the cut that may be made by the next following cutter.

The cutter equipped connector links 20' are alike except as to their being made in "rights" and "lefts" and arranged alternately at right and left side of the chain. Each cutter is integral with the body of the carrying link and comprises a blade or cutter body of a substantial length, and extending lengthwise of the link and extending beyond its outer edge. As seen in end view in Figs. 4 and 5, the cutters 20L and 20R are substantially of semi-cylindrical form, and terminate at their lower longitudinal edges in the central, longitudinal plane of the chain.

At their forward ends, the cutters are beveled inwardly, each to a sharpened cutting edge 35, and the bevel is such that the cutting edge is at the outside of the blade. Also, the forward, sharpened edge of the blade body extends from the line of the juncture of the blade and link body in a spiral direction, leading toward the rear end of the link so that from the point of first contact with the kerf wall, the blade edge is inclined rearwardly and has a planing action.

It may be explained further that the bottom edge of each cutter is sloped to provide a slight angle of rake as seen in Fig. 2. Also, a similar angle of rake may be provided at the side of the cutter.

In so far as the cutters themselves are concerned, the construction and arrangement is substantially like that disclosed in my previously mentioned co-pending application.

A feature of this invention resides in the provision for an abutting relationship of those links 18 and 19 which are in the same link group, while traveling along the sides of the blade 10. This provision of an abutting relationship is to eliminate the jack-knifing tendency or effect that in my previous design sometimes resulted from sawing hard wood, and it is accomplished as follows:

The rear end edge of each depth gauge link 19 is formed at the outside of the line of pivot pins, designated by line $p$—$p$ on link 19 in Fig. 6, with a flat edge surface 19x that is also perpendicular to the said line. Likewise, the forward end edge of the next following spacer link 18 is formed with a flat end surface 18x. When the chain is traveling along the bar, in cutting position, these flat end surfaces come flatly together as in Fig. 2.

Thus it will be understood that with the chain advancing in the kerf in the direction indicated by the arrow adjacent thereto in Fig. 2, there will be a tendency of the cutter equipped connector links 20' to pivot about their connections with the next adjacent links, but this result is prevented due to the abutting contact of the link end surfaces which, in effect, provides a rigid interlock.

In the modified form of construction shown in Fig. 7, the spacer links 118, which correspond to links 18 of the chain of Fig. 2, have downwardly extending shoulders 120 at their rear ends, and have forwardly and outwardly beveled end surfaces 125 at their forward ends. The depth gauge links 119, which correspond to links 19 of the chain of Fig. 2, have depth gauge runners 130 at their forward ends against which the shoulders 120 of the next forward link may abut as do the surfaces 18x and 19x of the links 18 and 19. Also, each link 119 has a beveled rear end surface 132 adapted to engage against the beveled forward end surface 125 of the next following link, thus to effect an abutting relationship that gives rigidity to the chain linkage when the chain is passing along the edge of the blade 10 and prevents the jack-knifing of links of the chain that might be due to cutting in hard wood.

Having thus described my invention, what I claim as new therein and desire to secure by Letters Patent, is:

In a power saw of the character described, in combination, a saw guide bar having a chain guide channel formed in a longitudinal edge thereof and a saw chain arranged to travel on the channeled edge of said bar; said chain comprising a succession of pivotally joined like link groups, each link group comprising a forward link equipped at its outer edge medially of its ends with a depth gauge runner and at its opposite edge with a wing for guided travel in the bar channel, a rearward spacer link formed at its outer edge with a wing for guided travel in the bar channel, complemental connector links disposed at opposite sides of the chain for sliding contact upon the edge of said guide bar, and pivot members extended through their ends and pivotally connecting the said forward and rearward links of the group in end-to-end relationship; said forward link and said rearward spacer link having adjacent end surfaces at the outside of and formed at an angle to the line of pivot members to engage in solid abutment while the chain is traveling along said longitudinal edge of the guide bar, one of the connector links having a kerf cutting blade formed as an integral part thereof and extended beyond the abutting surfaces of said forward and rearward links.

MAX MERZ.

REFERENCES CITED

The following references are of record in the file of this patent:

UNITED STATES PATENTS

| Number | Name | Date |
|---|---|---|
| 279,781 | Magaw | June 19, 1883 |
| 485,503 | Lewis | Nov. 1, 1892 |
| 815,256 | Bible et al. | Mar. 13, 1906 |
| 1,387,605 | Meyer | Aug. 16, 1921 |
| 1,634,645 | Bens | July 5, 1927 |
| 1,652,295 | Bens | Dec. 13, 1927 |
| 2,326,854 | Hassler | Aug. 17, 1943 |
| 2,351,112 | Day | June 13, 1944 |
| 2,351,738 | Blum | June 20, 1944 |

FOREIGN PATENTS

| Number | Country | Date |
|---|---|---|
| 593,463 | Germany | Feb. 27, 1934 |